United States Patent
Heinonen et al.

(10) Patent No.: US 6,728,530 B1
(45) Date of Patent: Apr. 27, 2004

(54) CALENDAR-DISPLAY APPARATUS, AND ASSOCIATED METHOD, FOR A MOBILE TERMINAL

(75) Inventors: Eeva-Liisa Heinonen, Tampere (FI); Jaakko Itävaara, Kirkkonummi (FI); Heidi Karves, Tampere (FI); Kai Kronström, Tampere (FI); Kari Lehtinen, Tampere (FI); Jari Mononen, Ruutanan (FI); Petri Nykänen, Tampere (FI); Mikko Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/472,756

(22) Filed: Dec. 28, 1999

(51) Int. Cl.[7] .................. H04M 3/42; G06F 15/16
(52) U.S. Cl. ............... 455/414.1; 455/418; 455/414.4; 455/466; 379/93.17; 704/260; 709/206
(58) Field of Search ................. 455/414.1, 418, 455/410, 417, 459, 566, 461, 466, 425, 550, 557, 422.1, 414, 456; 705/8, 9; 707/104, 507, 509; 379/93.17, 93.21, 93.23; 395/768, 773

(56) References Cited

U.S. PATENT DOCUMENTS

| | | | | |
|---|---|---|---|---|
| 5,323,314 A | * | 6/1994 | Baber | |
| 5,855,006 A | * | 12/1998 | Huemoeller | 705/9 |
| 5,873,108 A | * | 2/1999 | Goyal et al. | 345/764 |
| 5,933,778 A | * | 8/1999 | Buhrmann et al. | 455/461 |
| 6,064,975 A | * | 5/2000 | Moon | 705/8 |
| 6,084,951 A | * | 7/2000 | Smith | 379/93.17 |
| 6,104,788 A | * | 8/2000 | Shaffer | |
| 6,125,281 A | * | 9/2000 | Wells | |
| 6,163,274 A | * | 12/2000 | Lindgren | |
| 6,208,996 B1 | * | 3/2001 | Ben-Shachar | 707/104 |
| 6,219,694 B1 | * | 4/2001 | Lazaridis et al. | 709/206 |
| 6,246,870 B1 | * | 6/2001 | Dent et al. | 455/405 |
| 6,266,060 B1 | * | 7/2001 | Roth | 345/733 |
| 6,278,456 B1 | * | 8/2001 | Wang | |
| 6,285,889 B1 | * | 9/2001 | Nykanen | 455/557 |
| 6,292,668 B1 | * | 9/2001 | Alanara | 455/466 |
| 6,309,305 B1 | * | 10/2001 | Kraft | |
| 6,418,309 B1 | * | 7/2002 | Moon et al. | 455/418 |
| 6,477,374 B1 | * | 11/2002 | Shaffer et al. | 455/445 |
| 6,480,830 B1 | * | 11/2002 | Ford et al. | 705/9 |
| 2001/0014867 A1 | * | 8/2001 | Conmy | |

FOREIGN PATENT DOCUMENTS

| | | |
|---|---|---|
| EP | 0 921 670 A2 | 6/1999 |
| WO | WO 99/21100 | 4/1999 |

* cited by examiner

Primary Examiner—Sinh Tran
Assistant Examiner—Kamran Afshar

(57) ABSTRACT

Calendar display apparatus, and an associated method, displays the calendar display at a mobile terminal operable in a radio communication system. The calendar display includes calendar items retrieved from both a local storage element and from a network-based calendar database. The calendar items are displayed simultaneously. And, calendar items stored locally are exportable to the network database. Analogously, calendar items stored at the network database are downloadable to the mobile station to be stored thereat.

18 Claims, 4 Drawing Sheets

| MY CALENDAR | FAVORITE EVENTS | COMPANY | SPORT | MTV3 | Z |
|---|---|---|---|---|---|
| 9:00 | | | | | |
| 10:00 | MEETING WITH CARL | | TAMPERE BASKETBALL STARTS | | |
| 11:00 | | | | | |
| 12:00 | | | | | |
| 13:00 | | | | | |
| 14:00 | | | | | |
| 15:00 | | | | | |
| 16:00 | | | TAMPERE BASKETBALL FINALS | | |
| 17:00 | | | | | |
| 18:00 | | | | | |
| 19:00 | ILVES-TAPPARA, HAKAMETSA | | ILVES-TAPPARA, HAKAMETSA | | |
| 20:00 | | | | | |

*FIG. 2*

CALENDAR-DISPLAY APPARATUS, AND ASSOCIATED METHOD, FOR A MOBILE TERMINAL

The present invention relates generally to a manner by which to display database information at a mobile terminal operable in a radio communication system, such as a cellular mobile terminal operable in a cellular communication system. More particularly, the present invention relates to apparatus, and an associated method, by which to display calendar information at a mobile terminal. Calendar items stored, or generated, locally and calendar items stored, or generated, at a remote source, such as a network calendar database, are displayable simultaneously at the mobile terminal.

BACKGROUND OF THE INVENTION

Advancements in communication technologies have permitted the development, installation, and widespread usage of wireless communication systems through which to communicate telephonically. In a wireless communication system, a radio link forms at least a portion of a communication path upon which communication signals are transmitted. Increased mobility of communication is, as a result, permitted through the utilization of a wireless communication system.

The network infrastructure of various types of cellular communication systems, for instance, have been installed throughout significant geographical areas. Large numbers of subscribers to such cellular communication systems are able to communicate telephonically when positioned in areas encompassed by the network infrastructure of the system pursuant to which subscription is made. Telephonic communication of both voice and data is generally permitted in such cellular communication systems.

A subscriber to a cellular communication system typically utilizes a mobile terminal which is formed of a radio transceiver capable of both transmitting and receiving radio signals communicated upon radio links with the network infrastructure of the communication system. The term user shall be used herein to identify one utilizing the mobile terminal. Some communication systems utilize digital communication techniques in which information is digitized prior to its communication and subsequent to its reception. Processing circuitry is utilized to act upon information, prior to its transmission, and subsequent to its reception.

The circuitry forming a mobile terminal is oftentimes packaged in a housing which permits convenient carriage of the mobile terminal by a user. Various constructions of mobile terminals are of physical dimensions permitting a user thereof to carry the mobile terminal in a shirt pocket, or the like, of the user.

Because the mobile terminal utilizes processing circuitry, the processing circuitry can also be utilized to perform functions in addition to functions required to effectuate conventional communication operations. That is to say, functionality of other devices can be incorporated into the mobile terminal. For instance, information processing and retrieval functions are sometimes incorporated into a mobile terminal.

For instance, some mobile terminals are capable of communicating with a device connected to a packet data network, such as the Internet. That is to say, packets of data are able to be communicated between a mobile terminal and the device upon a communication pack which includes both the radio link and also a wireline path extending through a packet data backbone to the device. The mobile terminal is able, thereby, to be operated in a manner analogous to that of a personal computer, or other processing device, more typically utilized to access web-based devices.

Online calendars are exemplary of information retrievable from a device coupled to the Internet, or other packet data, backbone. Online calendars generally provide one or more of three types of views. One exemplary online calendar provides a personal calendar view listing the personal calendar of a user. Another online calendar provides an event list of a plurality of events, such as events occurring at a particular facility or events occurring on a particular date. And, another online calendar view forms an interests calendar which contains a subset of an event list filtered by an interest criteria.

Analogous personal calendars are also available for local use at a processing device, such as a personal computer. Such local calendars would also be available for personal use at a mobile terminal containing appropriate circuitry to access, display, and update a local calendar.

A mobile terminal operable in a GSM (Global System for Mobile communication) communication system which provides for SMS (Short Message Service) messaging is able to receive and send calendar items by way of a SMS message. Also, calendar items are selectable and a browser application is operable to open automatically a calendar application to handle the calendar item, such as vCalendar or iCalendar. The selection of the calendar application can be based, for instance, on the file type associated therewith, such a VCS.

Online calendars are advantageous for the reason that a user is able to access the calendar using any processing device connectable to the Internet, or other packet-based, backbone. However, the ability to access the backbone, and in turn, the device at which the online calendar is located is, of course, required. Conversely, locally-based calendars are accessible irrespective of access to the backbone. But, calendar items are limited to items which are locally stored or generated.

Conventionally, there is little interaction between conventional online calendars and locally-based calendars. The advantages inherent of an online calendar, therefore, are limited to users of online calendars. And, the advantages inherent of a locally-based calendar are available only to users of locally-based calendars.

If a manner could be provided by which to provide for interaction between locally-based calendars and online calendars, an improved calendar application would be provided.

It is in light of this background information related to the display of database information that the significant improvements of the present invention have evolved.

SUMMARY OF THE INVENTION

The present invention, accordingly, advantageously provides apparatus, and an associated method, by which to display calendar information at a mobile terminal operable in a radio communication system. The calendar information displayable at the mobile terminal permits both calendar items stored, or generated, locally at the mobile terminal and calendar items stored, or generated, at a remote source, such as a network calendar database, to be displayed simultaneously at the mobile terminal.

Through operation of an embodiment of the present invention, calendar displays generated pursuant to execution of a calendar application include calendar items provided by both a network calendar data base by way of a radio link and also with calendar items stored locally at the mobile terminal. The advantages inherent of both a locally-based calendar application and also of a network-based calendar application are provided by the calendar application of an embodiment of the present invention.

Up to date information pertaining to events of interest to a user of the mobile terminal are retrievable through operation of the calendar application and displayable at a portable, mobile terminal. Events and information, personal to the user of the mobile terminal, or otherwise not desired to be stored at a network-based device, conversely, are storable locally at the mobile terminal, thereby providing confidentiality of the personal information. Calendar displays displayable by the mobile terminal through operation of the calendar application of an embodiment of the present invention thereby permits upon a single calendar display calendar items, stored locally to maintain the confidentiality of such items, together with calendar items retrieved from a remote, network calendar database.

In one aspect of the present invention, calendar displays are displayed in the form of sheets upon a visual display device, such as a Liquid Crystal Display (LCD) screen. One sheet-type is a local sheet in which calendar items retrieved from a local storage element, or locally-entered, calendar items are positioned on the sheet and displayed at the display element of the mobile terminal. The local sheet is exportable to a remote server which forms the network calendar data base as well as another appropriate device through which the sheet is selected to be exported.

Another sheet-type is a pushed sheet in which calendar items are downloaded from a remote location, such as a network calendar data base, to be stored at the storage element of the mobile terminal. Calendar items displayed upon the pushed sheet include the calendar items downloaded to the mobile terminal. Because the calendar items, once downloaded to the mobile terminal, are stored thereat, immediate retrieval of the calendar items is thereafter possible irrespective of subsequent connection, or reconnection, of the mobile terminal to a remote network device.

And, another sheet-type is a network sheet in which calendar items are stored at a network calendar database and are retrieved therefrom to be displayed upon the network sheet. Retrieval of the calendar items to form the network sheet require a connection between the mobile terminal and the network database. Because the calendar items are stored at the network data base, such items are updatable, as appropriate. Thereby, the calendar items which form a network sheet are maintainable in an up-to-date level of accuracy. The calendar items forming the network sheet are also storable at the mobile terminal in like manner to the manner by which the calendar items of the pushed sheets are storable at the mobile terminal.

In one implementation, a calendar application is provided for a mobile terminal operable in a GSM (Global System for Mobile communications) cellular communication system. In one implementation, the GSM system provides for SMS (Short Message Service) messaging, and in another implementation, the GSM system further provides for GPRS (General Packet Radio Service). The mobile terminal is operable in an implementation in which the GSM system provides for SMS messaging to send and to receive SMS messages. And, in an implementation in which the GSM system further provides for GPRS, the mobile terminal is further operable to send and to receive packet data pursuant to GPRS. A calendar application is executable, such as through a user request to display selected calendar items upon a display element of the mobile terminal. Both calendar items stored, or entered locally at the mobile terminal, are displayable upon the display element of the mobile terminal, and calendar items retrieved from a remote network calendar database are displayable upon the display element of the mobile terminal. Calendar items retrieved from the network database and provided locally are displayable together upon a common display sheet, thereby to provide a user of the mobile terminal with both such calendar items.

In these and other aspects, therefore, calendar-display apparatus, and an associated method, is provided for a mobile terminal for displaying calendar information. The mobile terminal is operable in a radio communication system having network infrastructure with which the mobile terminal communicates by way of a radio link. The network infrastructure is coupled to a network-based calendar information source containing at least one network-based calendar item. A mobile-based calendar information source is positioned at the mobile terminal. The mobile-based calendar information source contains at least one mobile-based calendar item. A retriever is positioned at the mobile terminal. The retriever retrieves at least a selected network-based calendar item stored at the network-based calendar information source. The retriever further retrieves at least a selected mobile-based calendar item stored at the mobile-based calendar information source. A display element is coupled to receive indications of the selected network-based calendar item and of the selected mobile-based calendar item. The display element displays together, in human perceptible form, the selected network-based calendar item and the selected mobile-based calendar item.

A more complete appreciation of the present invention and the scope thereof can be obtained from the accompanying drawings, which are briefly summarized below, the following detailed description of the presently-preferred embodiment of the invention, and the appended claims.

BRIEF DESCRIPTION OF THE DRAWINGS

FIG. 2 illustrates a representation of an exemplary screen display generated during operation of an embodiment of the present invention.

DETAILED DESCRIPTION OF THE PREFERRED EMBODIMENT

Figure 1:
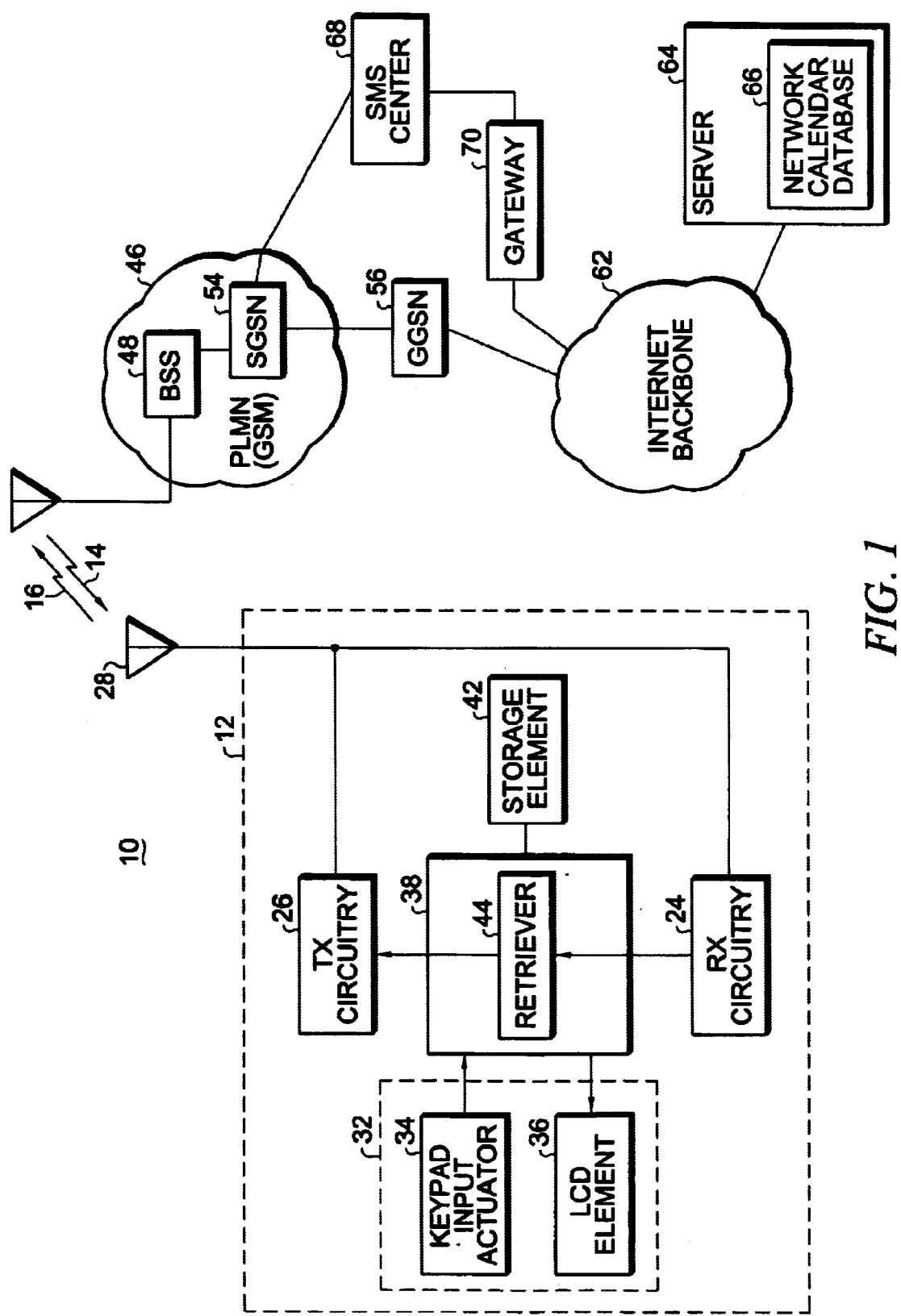
FIG. 1 illustrates a functional block diagram of a communication system in which an embodiment of the present invention is operable.

FIG. 1 illustrates a communication system, shown generally at 10, in which an embodiment of the present invention is operable. While the description shall be described with respect to the exemplary system shown in FIG. 1, it should be understood that such description is by way of example only. An embodiment of the present invention is analogously operable in other types of communication systems. For instance, while the exemplary system shown in FIG. 1 includes a GSM network, operation of an embodiment of the present invention can similarly be described with respect, e.g., to a so-called third generation network, such as that utilizing (W) CDMA (wideband code division multiple access). Accordingly, operation of an embodiment of the present invention can analogously be described with respect to such other types of communication systems.

The communication system 10 provides for wireless communications with a mobile station 12 by way of a radio link, here including downlink and uplink channels 14 and 16, respectively. In the exemplary implementation, the communication system 10 forms a GSM (Global System for Mobile communications) cellular communication system which provides for GPRS (General Packet Radio Service) as well as SMS (Short Message Service) messaging. The mobile station 12 forms a GSM mobile station operable pursuant to the appropriate GSM standard to communicate by way of the downlink 14 and uplink 16 in conventional manner with a remote communication system.

In conventional manner, the mobile station includes receiver circuitry 24 and transmitter circuitry 26 capable of receiving and transmitting, respectively, communication signals by way of an antenna transducer 28. The mobile station 12 is operable to effectuate circuit-switched communications by way of the downlink and uplink 14 and 16. The mobile station is further operable to communicate SMS messaging pursuant to the protocol set forth in the appropriate GSM standard and also to effectuate GPRS operations, also pursuant to the appropriate GSM standard. SMS messages and GPRS operations are performed upon shared uplink and downlink channels upon which packets of data are communicated with the mobile station.

The mobile station further includes a user interface 32, here including a keypad input actuator 34, selectably actuable by a user of the mobile station. The user interface also includes a display device, here a LCD (Liquid Crystal Display) element 36. The input actuator 34 and the LCD element 36 are coupled to a controller 38. The controller 38 is operable, inter alia, to control operations of the receive circuitry 24 and transmit circuitry 26, such as responsive to user actuation of the keypad input actuator 34. The controller is also operable to effectuate the generation of displays, pursuant to operation of an embodiment of the present invention, upon the LCD element 36.

The mobile station further includes a storage element 42 operable to store calendar items and sheet templates thereat. The memory 42 is a read/write memory to permit calendar items, retrieved from elsewhere, or generated through actuation of selected actuation keys of the keypad actuator 34 to be stored thereat and to be updated, as appropriate.

The controller includes a functional element, here identified as a retriever 44. The retriever is operable during operation of an embodiment of the present invention, to retrieve calendar items stored at the storage element 42 for display upon the LCD element 36. The retriever 44 is also operable to effectuate the retrieval of remotely-stored calendar items, also for display at the LCD element 36, together with the locally-stored calendar elements, to be displayed theretogether upon a common display at the LCD element.

The communication system further includes the network infrastructure of the PLMN (public land mobile network), here a GSM network 46. The network 46 is here shown to include a base station system 48 and an SGSN (Serving GPRS Support Node) 54. The elements of the network infrastructure of the GSM network are operable in conventional manner and provide transceiving switching, and routing function, all as set forth in greater detail in the appropriate GSM specification.

The SGSN 54, in turn, is coupled, in conventional manner to a GGSN (Gateway GPRS Support Node) 56. And, in turn, the GGSN 56 is coupled to a packet data network, here the Internet backbone 62. A server 64 containing a network calendar database 66 is coupled, in conventional manner, to the Internet backbone. Access to the contents of the network calendar database is effectuated pursuant to retrieval operations by, e.g., TCP/IP (Transport Control Protocol) requests. A SMS (Short Message Service) center 68 is further shown in the figure. In conventional manner, the SMS center is coupled to the GSM network 46 and to the Internet backbone 62, here by way of a gateway 70. The SMS center functions as a store and forward center for storing and forwarding SMS messages generated during operation of the communication system.

During operation of an embodiment of the present invention, the retriever 44 of the controller 38 of the mobile station is operable to cause retrieval of calendar items stored at the network calendar database 66 so that the retrieved calendar items can be displayed at the LCD element 36. Because the retriever is operable both to retrieve locally-stored calendar items from the storage element 42 and to effectuate retrieval of calendar items stored at the network calendar database 66, the display displayed upon the LCD element is able to include both network-stored calendar items and locally-stored calendar items upon a common calendar display.

In the exemplary implementation, initiation of operation of a calendar display is effectuated by user actuation of selected keys of the keypad actuator 34. The retriever 44 is operable to detect the actuation of the keypad actuator 34 indicative of the request for the display of the calendar program. Responsive thereto, the retriever retrieves one or more calendar items stored at the storage element 42. The retriever is further operable to cause the transmit circuitry 26 to generate a message which is transmitted upon a channel of the uplink 16, thereafter to be detected by the base station 48 and routed through the elements of the network portion of the communication system 10 to the server 64. The one or more networkbased calendar items contained in the request are routed back to the mobile terminal in reverse manner transmitted upon a channel of the downlink 14, detected by the receive circuitry 24 of the mobile station and thereafter caused by the retriever 44 to be displayed at the LCD element 36. In one implementation, the retriever causes the transmit circuitry 26 to generate an SMS message which is transmitted upon a channel of the uplink 16, detected by the base station system 48 and routed to the SMS center 68. The SMS center 68, in turn, causes generation of a request that is routed to the server 64. A reply containing the one or more network-calendar elements is returned to the SMS center 68. And, the SMS center 68 generates a SMS message that is routed through the elements of the network infrastructure of the GSM network and transmitted upon a channel of the downlink 14 to the mobile station 12.

In an implementation in which the GSM system provides for GPRS, a GPRS message is caused to be generated by the transmit circuitry 26. The GPRS message is routed through the network infrastructure of the GSM network, thereafter to be routed to the server 64. One or more network-based calendar items are retrieved and returned by way of a corresponding GPRS message which, when received at the mobile station, is caused to be displayed upon the LCD element 36 as a calendar display on a common user interface with calendar items retrieved from the storage element 42.

In one implementation, calendar displays displayed upon the LCD element are displayed in the form of sheets. One sheet-type is a local sheet including calendar items retrieved from the storage element 42 or entered through actuation of the keypad actuator 34. Such local sheets are exportable to the network calendar database 66 through the transmission of messages, such as SMS messages or GPRS messages containing the calendar information forming the local sheet. Another sheet-type is a pushed sheet which contains calendar items retrieved, in manners as above-described from the network calendar database 66 and then stored at the storage element 42. Once stored at the storage element, the calendar items are retrievable thereafter irrespective of subsequent connection of the mobile terminal by way of a radio link with the server 64. And, another sheet-type is a network sheet. Calendar items displayable upon a network sheet are retrieved from the network calendar database 66, in manners above-described, and updating of the calendar items are made by appropriate transmission of messages used to write over, or otherwise update, existing calendar items stored at the network calendar database.

FIG. 2 illustrates an exemplary calendar display, shown generally at 76, generated during operation of an exemplary embodiment of the present invention. The calendar display 76 is displayed upon the LCD element 36 of the mobile station 12. The display 76 here forms a daily calendar listing scheduled events indexed against a time-of-day index identified by a listing of successive hours of the day in a left-most (as shown) column 78.

The calendar display 76 includes a first screen body portion 82 and a second screen body portion 84. The first screen body portion 82 initially lists personal calendar items, i.e., calendar items retrieved from the storage element 42 (shown in FIG. 1). The calendar item "meeting with Carl" scheduled at 10:00 is a local calendar item. The calendar items displayed at the second screen body portion 84 are, initially, network-stored calendar items, i.e., calendar items retrieved from the network calendar database 66 (shown in FIG. 1). The calendar items "Tampere basketball starts," "Tampere basketball finals," and "Ilves-Tampere, Hakametsa" are such network-based calendar items.

Additional operation of an embodiment of the present invention permits the network-based calendar items displayed upon the calendar display to be copied to the stored at the local storage element of the mobile station. As shown at the calendar entry at 1900 hours, the network-based calendar item displayed at the second screen body portion is copied to the first screen body portion.

A top (as shown) toolbar portion of the calendar display. The toolbar portion includes an identification portion 86, here indicating that the calendar display is "My Calendar," a push information indicator 88 indicating the type of calendar items which are downloaded to the mobile station without specific request therefor, a second pushed-portion 92, here indicating that "Company" calendar items are to be pushed to the mobile station, a third push-portion 94, here indicating that "Sport" information is pushed to the mobile station, and a fourth push-portion 96, here indicating also that "MTV3" information is to be pushed to the mobile station, and an indicator 98 identifying a link list of available calendar views displayable at the calendar display device. The calendar display 76 thereby provides a convenient display to a user of the mobile station of both locally-stored calendar items and network-stored calendar items. Other calendar displays are analogously also able to be displayed at the LCD element 36 (shown in FIG. 1).

Figure 3:
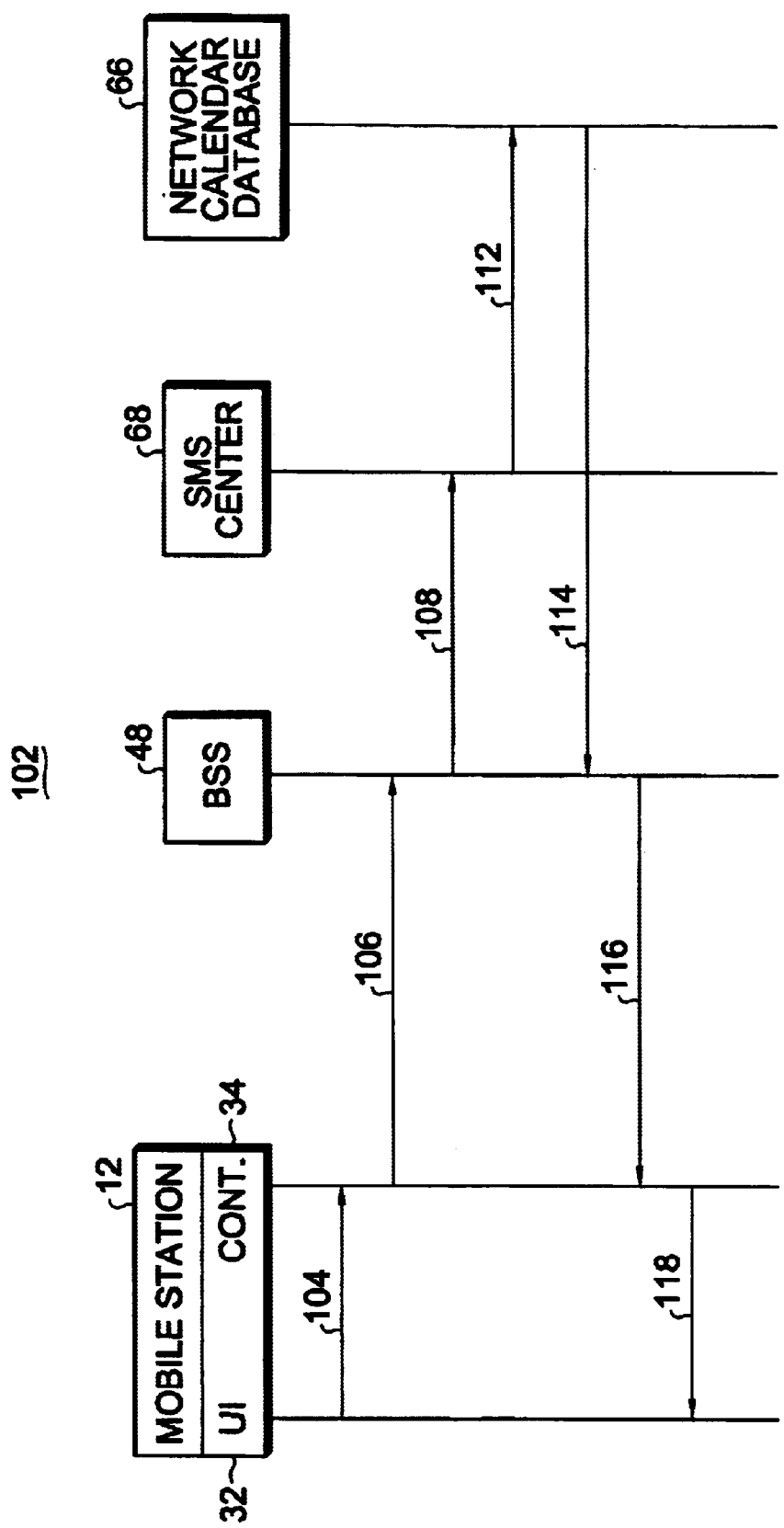
FIG. 3 illustrates a message sequence diagram listing the sequence of the messages generated during operation of an embodiment of the present invention.

FIG. 3 illustrates a message sequence diagram, shown generally at 102, showing the sequence of signals generated during operation of the communication system shown in FIG. 1 pursuant to an embodiment of the present invention. First, and as indicated by the segment 104, a signal is generated responsive to user actuation of a keypad actuator of the user interface 32. The signal indicates initiation of a request for display at the display element of the mobile station of a calendar display. The controller 34 detects the signal. The controller, in turn, causes the transmit circuitry of the mobile station to generate a signal, here a SMS message, represented by the segment 106 which is sent to the base station system 48 of the network infrastructure of the communication system. The base station system routes a signal representative of the request, and here indicated by the segment 108, to the SMS center 68. And, the SMS center, in turn, generates a signal, here indicated by segment 112, which accesses the network database 66 of the server 64 (shown in FIG. 1). Calendar items are retrieved from the network database, and signals representative thereof, here indicated by the segment 114, are routed back through the SMS center and to the base station system 48. The base station system generates a downlink signal, here represented by the segment 116, which is detected by the receive circuitry 24 (shown in FIG. 1) of the mobile station, and provided to the controller 44. The controller, in turn, and as indicated by the segment 118, sends signals to the LCD element of the user interface. A calendar display containing the retrieved calendar item is displayed thereat.

Figure 4:
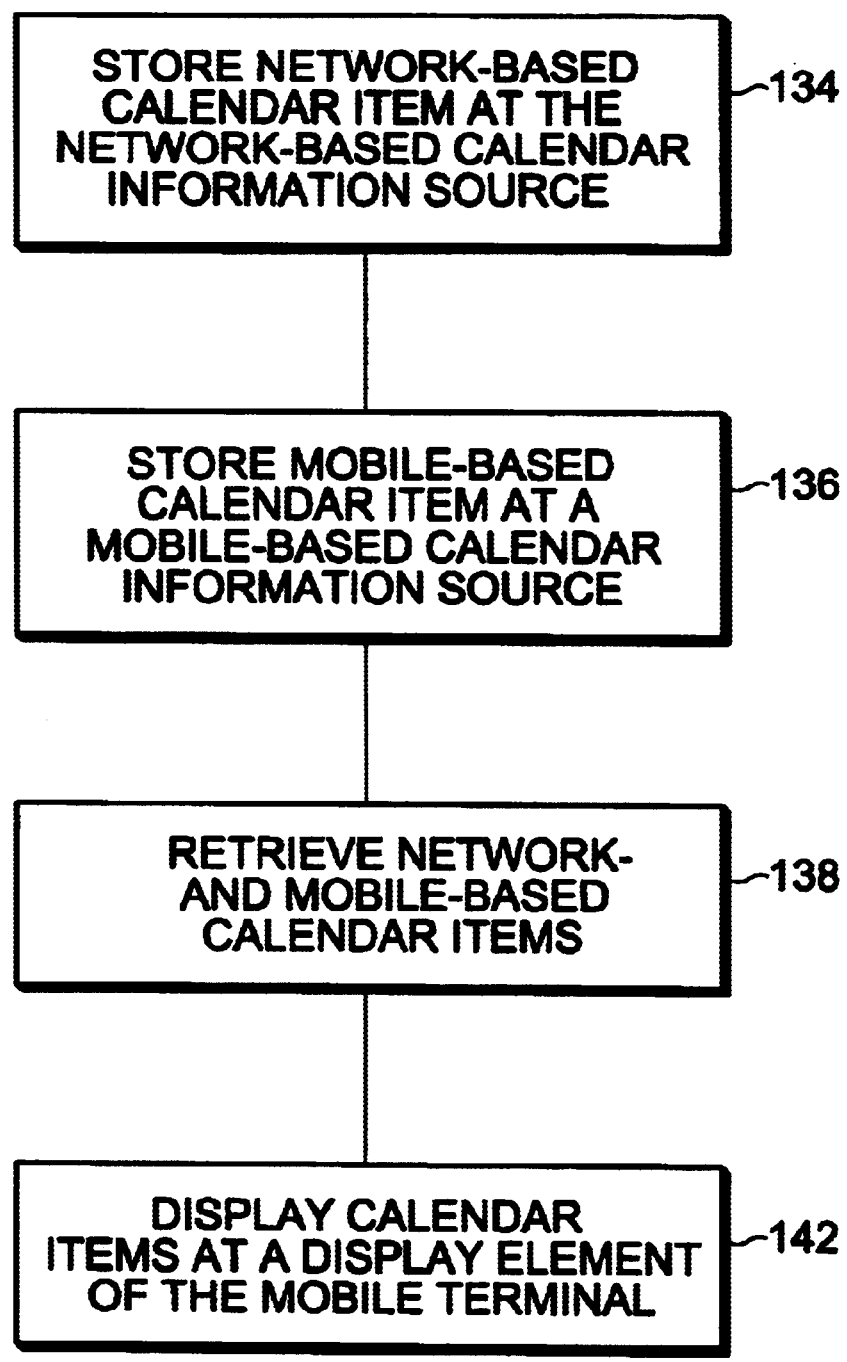
FIG. 4 illustrates a method flow diagram listing the method steps of the method of operation of an embodiment of the present invention.

FIG. 4 illustrates a method flow diagram, shown generally at 132, of an embodiment of the present invention. The method 132 is operable to cause the display of calendar information at a mobile terminal operable in a radio communication system.

First, and as indicated by the block 134, at least one network-based calendar item is stored at a network-based calendar information source. Then, and as indicated by the block 136, at least one mobile-based calendar item is stored at a mobile-based calendar information source located at the mobile terminal.

Thereafter, at least a selected network-based calendar item stored at the network-based calendar information source and at least a selected mobile-based calendar item are retrieved. And, as indicated by the block 142, a selected network-based calendar and a selected mobile-based calendar item are together displayed at a display element of the mobile terminal.

Thereby, through operation of an embodiment of the present invention, calendar items, stored at both a network calendar database and locally at a mobile terminal, are displayable together at the mobile terminal upon a common calendar display.

The previous descriptions are of preferred examples for implementing the invention, and the scope of the invention should not necessarily be limited by this description. The scope of the present invention is defined by the following claims.

We claim:

1. In a mobile terminal operable by a user thereof in a radio communication system having network infrastructure with which the mobile terminal communicates by way of a radio link, the network infrastructure coupled to a network-based calendar information source containing at least one network-based calendar item, an improvement for the mobile terminal of calendar-display apparatus for displaying at the mobile terminal calendar information, said calendar-display apparatus comprising: a mobile-based calendar information source positioned at the mobile terminal, said mobile-based calendar information source containing at least one mobile-based calendar item; a retriever positioned at the mobile terminal, said retriever selectably for retrieving by way of the radio link, upon initiation by the user of the mobile terminal, at least one selected network-based calendar item, stored at the network based calendar information source, and for retrieving at least one selected mobile-based calendar item stored at said mobile based calendar information source; and a display element coupled to receive indications of the selected network-based calendar item and of the selected mobile-based calendar item, said display element for displaying together and simultaneously, in human perceptible form, the selected network-based calendar item, retrieved by said retriever by way of the radio link, and the selected mobile-based calendar item, retrieved by said retriever from said mobile-based calendar information source, as a common calendar display at least during the radio-link connection, between the mobile terminal and the network infrastructure; further comprising a user actuator positioned at the mobile terminal and coupled to said mobile-based information source, said user actuator actuable selectably by a user to store the at least one mobile-based calendar item at said mobile-based calendar information source.

2. The apparatus of claim 1, further comprising a copier, wherein said copier is selectably operable to copy the selected mobile based calendar item to the network-based calendar information source.

3. The apparatus of claim 1 wherein the mobile terminal comprises transmit circuitry and receive circuitry, and wherein said retriever causes the transmit circuitry to transmit a retrieve request, the retrieve request for requesting retrieval of the selected network based calendar item from the network-based calendar information source.

4. The apparatus of claim 3 wherein said retriever further causes the receive circuitry to detect, when received at the receive circuitry, indications of the selected network-based calendar item, retrieved responsive to the request therefor.

5. The apparatus of claim 4 wherein the communication system comprises a GSM (Global System for Mobile communications) cellular communication system which provides for SMS (Short Message Service) messaging and wherein the retrieve request caused by said retriever to be transmitted by the transmit circuitry comprises a first SMS message.

6. The apparatus of claim 5 wherein the indications of the selected network-based calendar item which said retriever causes the receive circuitry to detect, comprises a second SMS message.

7. The apparatus of claim 4 wherein the communication system comprises a GSM (Global System for Mobile communications) cellular communication system which provides for GPRS (General Packet Radio Service) and wherein the retrieve request caused by said retriever to be transmitted by the transmit circuitry comprises a first GPRS message.

8. The apparatus of claim 7 wherein the indications of the selected network-based calendar item comprise a second GPRS message.

9. The apparatus of claim 1 wherein said display element displays the selected network-based calendar item and the selected mobile-based calendar item in visual form.

10. The apparatus of claim 1 wherein said display element includes a video screen, the video screen for displaying a display sheet thereon, the display sheet including the selected network-based calendar item and the selected mobile-based calendar item.

11. The apparatus of claim 10, wherein the display sheet comprises a plurality of mobile-based calendar items forming a local sheet, the local sheet exportable to the network-based calendar information source.

12. The apparatus of claim 10 wherein the display sheet comprises a plurality of network-based calendar items, exported to the mobile terminal and stored thereat and forming a pushed sheet, the pushed sheet exportable to the network-based calendar information source.

13. The apparatus of claim 10 wherein the display sheet comprises a plurality of network-based calendar items forming a network sheet, the network sheet exportable to be stored at said mobile-based calendar information source.

14. A method for displaying calendar information at a mobile terminal, the mobile terminal having a calendar application and operable by a user thereof in a radio communication system having network infrastructure with which the mobile terminal communicates by way of a radio link, and the network infrastructure coupled to a network-based calendar information source, said method comprising: detecting initiation of a request by the user of the mobile terminal to retrieve at least one selected network-based calendar item stored at the network based calendar information source; retrieving the at least one selected network-based calendar item stored at the network-based calendar information source by way of the radio link, and retrieving at least one selected mobile-based calendar item stored in association with the mobile-terminal calendar application; and displaying the selected network-based calendar item and the selected mobile-based calendar item, retrieved during said operation of retrieving, simultaneously on a display element of the mobile terminal using the calendar application as a common calendar display at least during connection by way of the radio link between the mobile terminal and the network infrastructure; further comprising a user actuator positioned at the mobile terminal and coupled to said mobile-based information source, said user actuator actuable selectable by a user to store the at least one mobile-based calendar item at said mobile-based calendar information source.

15. The method of claim 14 wherein said operation of retrieving comprises sending, from the mobile terminal, a retrieve request requesting retrieval from the network-based calendar information-source the selected network-based calendar item.

16. The method of claim 15 wherein said operation of retrieving further comprises detecting indications of the selected network-based calendar item at the mobile terminal, provided thereto responsive to the retrieve request.

17. The method of claim 14 comprising the additional operation of storing the selected network-based calendar item, retrieved during said operation of retrieving, at the mobile-based calendar information source.

18. The method of claim 14 comprising the additional operation of storing the selected mobile-based calendar item, retrieved during said operation of retrieving, at the network-based calendar information source.

* * * * *